United States Patent
Li et al.

(10) Patent No.: US 9,403,642 B2
(45) Date of Patent: Aug. 2, 2016

(54) OBJECT SIFTING DEVICE

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ching-Chuan Li, New Taipei (TW); Zhen-Hua Zhang, Shenzhen (CN); Yang Zhang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/612,917

(22) Filed: Feb. 3, 2015

(65) Prior Publication Data
US 2016/0114977 A1    Apr. 28, 2016

(30) Foreign Application Priority Data
Oct. 22, 2014    (CN) .......................... 2014 1 0564931

(51) Int. Cl.
*B65G 11/20*    (2006.01)
*B65G 11/02*    (2006.01)

(52) U.S. Cl.
CPC ............ *B65G 11/203* (2013.01); *B65G 11/023* (2013.01)

(58) Field of Classification Search
CPC .... B65G 11/203; B65G 11/023; B65G 47/14; B65G 47/1407; B65G 47/244; B65G 47/525; B65G 2047/685
USPC ........ 193/44, 46, 47; 198/493, 525, 533, 380, 198/390; 221/68
See application file for complete search history.

(56) References Cited

U.S. PATENT DOCUMENTS

| | | | | |
|---|---|---|---|---|
| 4,953,749 A * | 9/1990 | Kubota | ................ | H05K 13/027 221/168 |
| 4,995,157 A * | 2/1991 | Hall | ..................... | H05K 13/022 198/385 |
| 5,070,988 A * | 12/1991 | Konishi | ............. | B65G 47/1407 193/2 B |
| 5,513,739 A * | 5/1996 | Berg | .................... | B65G 47/256 198/380 |
| 5,570,812 A * | 11/1996 | Ando | ................... | H05K 13/028 198/444 |
| 5,806,715 A * | 9/1998 | Hamuro | ............. | H05K 13/0434 141/18 |
| 5,871,082 A * | 2/1999 | Kando | ................ | B65G 47/256 198/380 |
| 6,116,821 A * | 9/2000 | Teoh | ..................... | B23P 19/005 406/112 |
| 6,116,822 A * | 9/2000 | Teoh | .................. | B65G 47/1407 198/468.2 |
| 6,210,079 B1 * | 4/2001 | Teoh | ..................... | B23P 19/005 406/12 |
| 7,284,934 B2 * | 10/2007 | Hoogers | ............. | H05K 13/027 221/278 |
| 7,464,803 B2 * | 12/2008 | Cashimere | ........... | B65G 47/086 198/389 |
| 2015/0174616 A1 * | 6/2015 | Li | ............................. | B07B 4/08 209/3.1 |

* cited by examiner

*Primary Examiner* — Leslie A Nicholson, III
*Assistant Examiner* — Keith R Campbell
(74) *Attorney, Agent, or Firm* — ScienBiziP, P.C.

(57) ABSTRACT

A sifting device for components such as nuts includes a box, a supporting frame, a guiding board, and a covering board. The box receives the components. The guiding board is secured on the supporting frame and defines a receiving recess and a sliding groove, the receiving recess communicates with the box and the sliding groove. The covering board covers the guiding board and defines a plurality of holes as air jets, the plurality of holes aim at the receiving recess and the sliding groove to blow the components through the sifting device in an orderly manner.

19 Claims, 3 Drawing Sheets

OBJECT SIFTING DEVICE

FIELD

The subject matter herein generally relates to handling devices.

BACKGROUND

In assembly of electronic devices, such as mobile phones, multiple components such as nuts usually need to be fixed to components of the electronic devices. The multiple components are sifted according to positions of the components or other criteria by manual operation.

BRIEF DESCRIPTION OF THE DRAWINGS

Implementations of the present technology will now be described, by way of example only, with reference to the attached figures.

DETAILED DESCRIPTION

Figure 1:
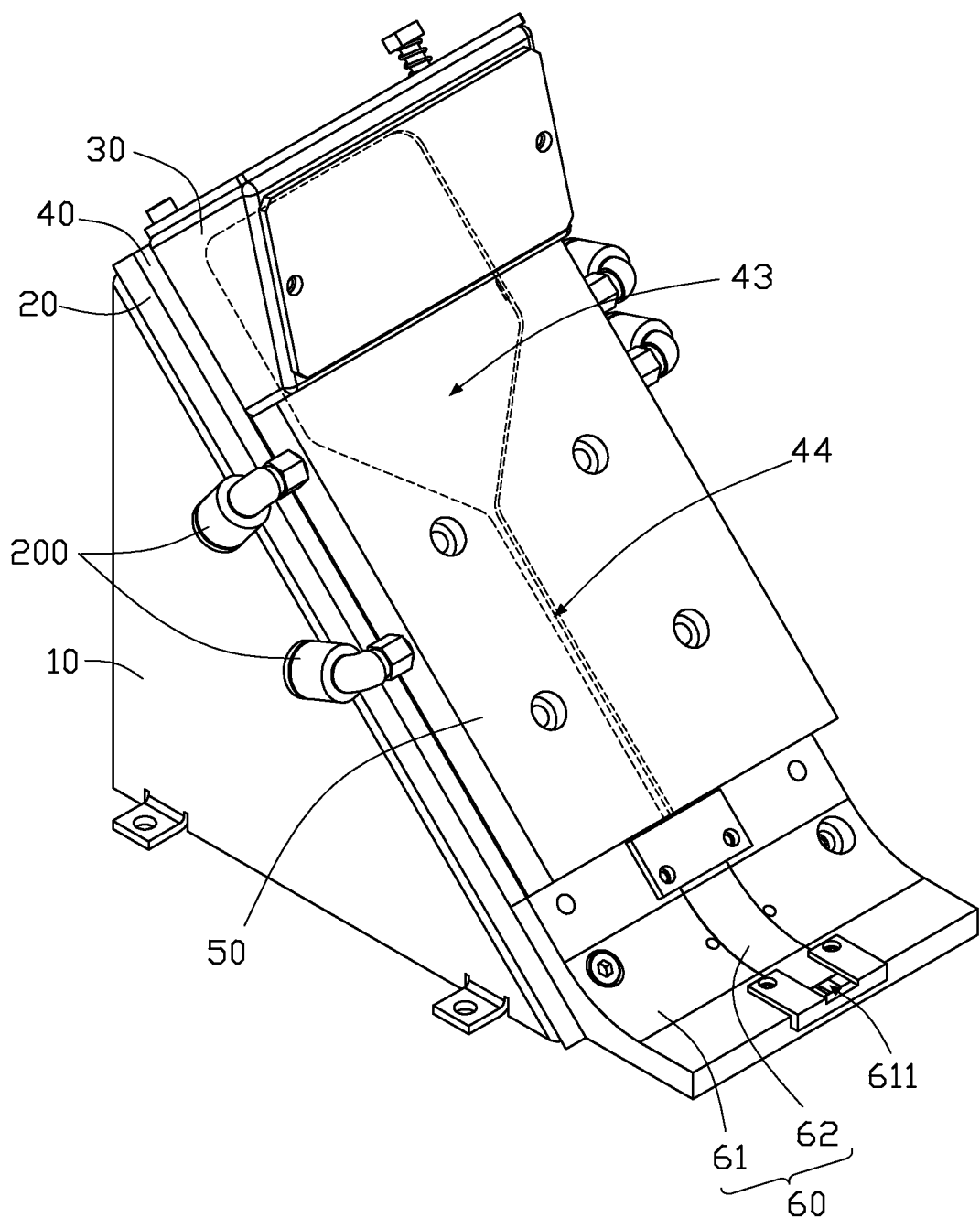
FIG. 1 is an assembled, isometric view of a sifting device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a sifting device.

FIG. 1 illustrates an embodiment of a sifting device 100, according to an exemplary embodiment. The sifting device 100 is configured to sort and parse multiple types of components (not shown), such as nuts.

The sifting device 100 includes a supporting frame 10, at least one connecting board 20, a box 30, a guiding board 40, a covering board 50, and a collecting assembly 60. The at least one connecting board 20 is supported by the supporting frame 10. The guiding board 40 is secured on the at least one connecting board 20. The box 30 is secured on a first end of the guiding board 40 for accommodating the components. The covering board 50 covers the guiding board 40, and the collecting assembly 60 is positioned on a second end of the guiding board 40. The components pass through the guiding board 40, and then slide to the collecting assembly 60.

Figure 2:
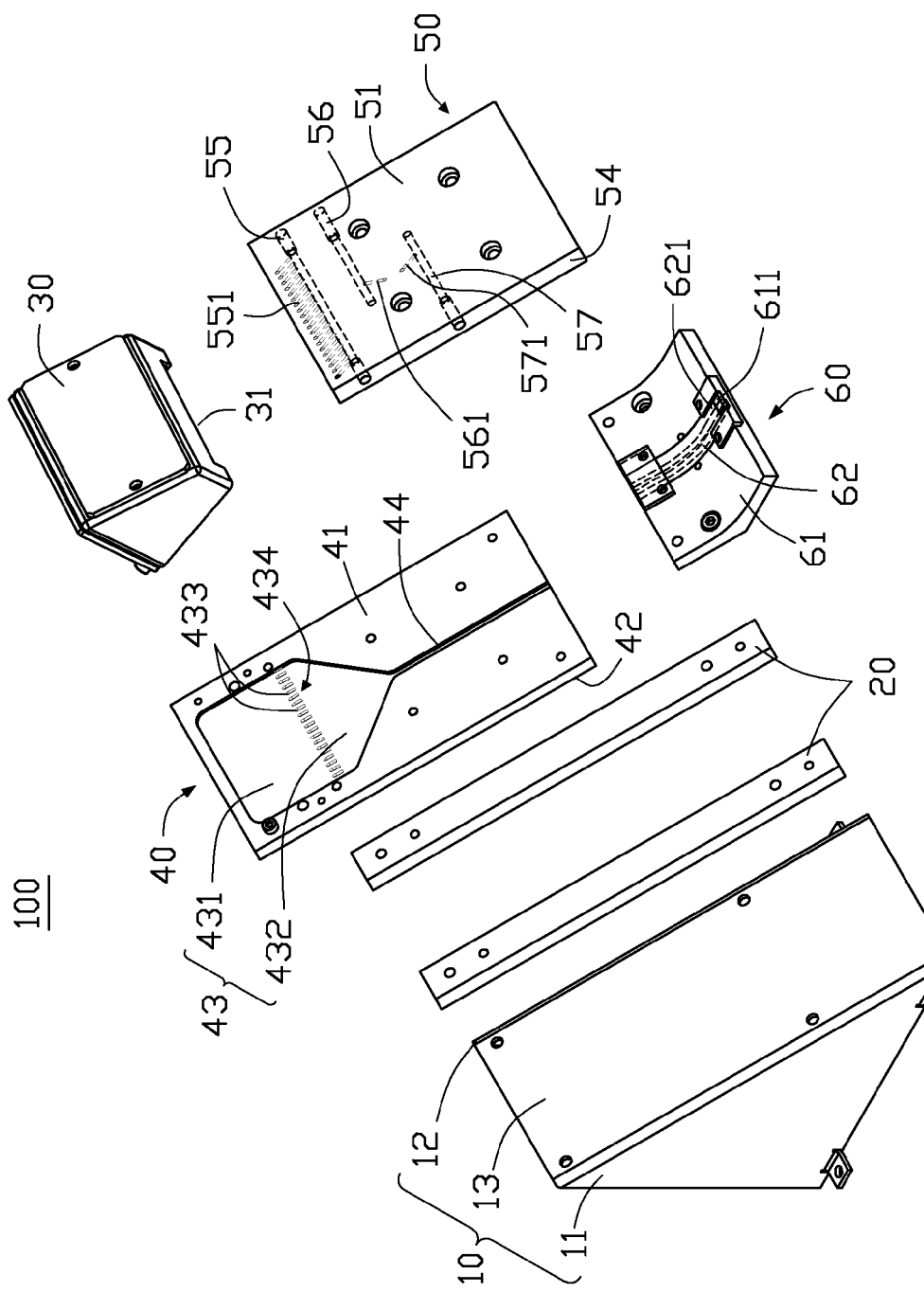
FIG. 2 is an exploded, isometric view of the sifting device of FIG. 1.

FIG. 2 illustrates that the supporting frame 10 can have a triangular cross-sectional shape. The supporting frame 10 includes two sidewalls 11, 12 and an inclined wall 13 sandwiched between the two sidewalls 11, 12. In at least one embodiment, two connecting boards 20 lean against the inclined wall 13 and are spaced from each other.

The box 30 defines an opening 311 to allow the components to exit from the box 30.

Figure 3:
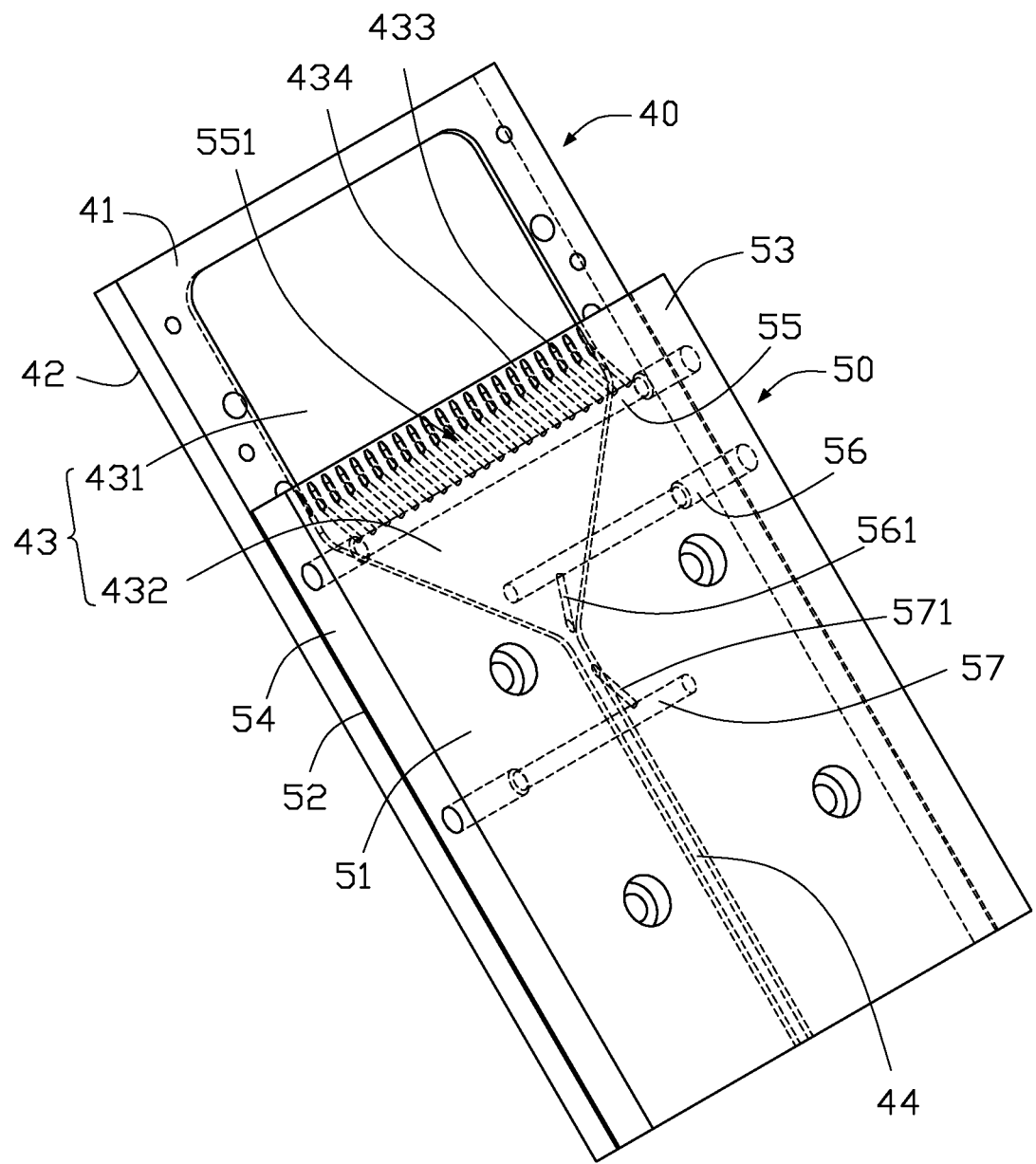
FIG. 3 is a partially assembled, isometric view of a guiding board and a covering board of the sifting device of FIG. 1.

The guiding board 40 and the covering board 50 are jointly configured to sift components. FIG. 3 illustrates that the guiding board 40 can have a rectangular shape and include a first mounting plane 41 and a second mounting plane 42 opposite to the first mounting plane 41. In at least one embodiment, the guiding board 40 is fixed to the connecting board 20 by a plurality of positioning pins (not shown). The first mounting plane 41 defines a receiving recess 43 and a sliding groove 44. In detail, the receiving recess 43 is tapered and includes a first portion 431 and a second portion 432 communicating with the first portion 431. A plurality of protrusions 433 protrude from a junction of the first portion 431 and the second portion 432. The plurality of protrusions 433 are arranged in a line and spaced from each other, thereby defining a slit 434 between every two neighboring protrusions 433. The sliding groove 44 communicates with the second portion 432 of the receiving recess 43 and extends to a distal end of the guiding board 40.

The covering board 50 includes a first covering plane 51, a second covering plane 52, a first peripheral plane 53, and a second peripheral plane 54. The first covering plane 51 is opposite to the second covering plane 52. The first peripheral plane 53 and the second peripheral plane 54 are connected between the first covering plane 51 and the second covering plane 52 in parallel. A first mounting hole 55 transversely passes through the first peripheral plane 53 and the second peripheral plane 54 and a second mounting hole 56 passes through the first peripheral plane 53 and extends towards the second peripheral plane 54. A third mounting hole 57 passes through the second peripheral plane 54 and extends towards the first peripheral plane 53. The covering board 50 further defines a plurality of first air holes 551 communicating with the first mounting hole 55 and inclinedly extending towards the second covering plane 52. Optionally, the plurality of first air holes 551 can be arranged in parallel. In addition, a second air hole 561 communicates with the second mounting hole 56 and inclinedly extends towards the second covering plane 52. A third air hole 571 communicates with the third mounting hole 57 and inclinedly extends towards the second covering plane 52. In at least one embodiment, the third air hole 571 is substantially parallel to the plurality of first air holes 551 and is opposite to the second air hole 561.

The collecting assembly 60 is configured to output the components sifted by the guiding board 40 and the covering board 50. The collecting assembly 60 includes a baseplate 61 and a baffle 62. The baseplate 61 can have an arcuate shape and defines a guiding groove 611. A first end of the baseplate 61 is fixed to the connecting board 20 and is positioned adjacent to the guiding board 40. Thus, the guiding groove 611 communicates with the sliding groove 44 for receiving the components. The baffle 62 is firmly mounted on the baseplate 61 to cover the guiding groove 611 to prevent the components from moving backwards during a period of sliding in the guiding groove 611. Additionally, the baffle 62 defines an outlet 621 for partially exposing the guiding groove 611.

Referring to FIG. 1 and FIG. 3, in assembly, the covering board 50 covers the guiding board 40 to allow the second covering plane 52 to face the first mounting plane 41 of the guiding board 40. At this time, each of the plurality of first air holes 551 is directed at a single one of the plurality of slits 434, the second air hole 561 aims at the second portion 432, and the third air hole 571 aims at the sliding groove 44. In addition, a number of air pumps 200 are connected to the first mounting hole 55, the second mounting hole 56, and the third mounting hole 57, to provide air to the sifting device 100. Optimally, the air pump 200 provides the air to the first mounting hole 55, the second mounting hole 56, and the third mounting hole 57 at intervals.

In use, the components enter the receiving recess 43 from the opening 311 of the box 30, and accumulate in the junction of the first portion 431 and the second portion 432. At this time, air is injected into the plurality of first air holes 551 via the first mounting hole 55 targeting the components. Thus, a position of the components can be changed to enable the components to pass through the plurality of slits 434. Then, the air injected into the second air hole 561 and the third air hole 571 blows on the components accumulated in the second portion 432 to allow the components to enter the sliding groove 44. This cycle repeats, all of the components including any which are misaligned in the plurality of slits 434 can pass through the sliding groove 44, and consequently enter into the collecting assembly 60. Thus, the components can be picked up by a manipulator (not shown).

In summary, the guiding board 40 defines the plurality of slits 434 and the sliding groove 44, and the covering board 50 defines a plurality of holes. Thus, the air can be injected into the holes to ensure the components pass through the plurality of slits 434 and the sliding groove 44, and then the components avoid being jammed in the guiding board 40. Thus, the components can be sifted by the sifting device 100, thereby saving cost and improving work efficiency.

The embodiments shown and described above are only examples. Many details are often found in the art such as the other features of the sifting device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A sifting device for components, the sifting device comprising:
    a box configured to receive the components;
    a supporting frame;
    a guiding board secured on the supporting frame and comprising a surface defining a receiving recess and a sliding groove, the receiving recess communicating with the box and the sliding groove; and
    a covering board comprising a first covering plane and a second covering plane, and covering the guiding board to allow the second covering plane to face the surface of the guiding board, the covering board defining a plurality of holes inclinedly extending towards the second covering plane, the plurality of holes aiming at the receiving recess and the sliding groove to allow air to be injected into the holes to blow the components.

2. The sifting device as claimed in claim 1, wherein the receiving recess comprises a first portion and a second portion communicating with the first portion, and a plurality of protrusions protrude from a junction of the first portion and the second portion.

3. The sifting device as claimed in claim 2, wherein the plurality of protrusions are spaced from each other to define a slit between every two neighboring protrusions.

4. The sifting device as claimed in claim 2, wherein the sliding groove communicates with the second portion and extends to a distal end of the guiding board.

5. The sifting device as claimed in claim 3, wherein the covering board comprises a first peripheral plane and a second peripheral plane, the first covering plane is opposite to the second covering plane, the first peripheral plane and the second peripheral plane are connected between the first covering plane and the second covering plane in parallel, the plurality of holes comprise a first mounting hole, a second mounting hole, and a third mounting hole, the first mounting hole transversely passes through the first peripheral plane and the second peripheral plane, the second mounting hole passes through the first peripheral plane, and the third mounting hole passes through the second peripheral plane.

6. The sifting device as claimed in claim 5, wherein the plurality of holes further comprise a plurality of first air holes, a second air hole, and a third air hole, the plurality of first air holes communicate with the first mounting hole and extends towards through the second covering plane, the second air hole communicates with the second mounting hole and extends towards the second covering plane, the third air hole communicates with the third mounting hole and extends towards the second covering plane.

7. The sifting device as claimed in claim 6, wherein the plurality of first air holes aim at the plurality of slits, respectively, the second air hole aims at the second portion, and the third air hole aims at the sliding groove.

8. The sifting device as claimed in claim 1, further comprising two connecting boards leaning against the supporting frame, wherein the guiding board is fixed on the two connecting boards.

9. The sifting device as claimed in claim 1, further comprising a collecting assembly, wherein the collecting assembly comprises a baseplate and a baffle, the baseplate defines a guiding groove communicating with the sliding groove, the baffle is mounted on the baseplate to cover the guiding groove.

10. The sifting device as claimed in claim 9, wherein the baffle defines an outlet for partially exposing the guiding groove.

11. A sifting device for components, the sifting device comprising:
    a box configured to receive the components;
    a supporting frame;
    a guiding board secured on the supporting frame and defining a receiving recess and a sliding groove, the receiving recess communicating with the box and the sliding groove; and
    a covering board covering the guiding board and defining a plurality of holes;
    wherein a plurality of protrusions protrude from the receiving recess to define a slit between every two neighboring protrusions, the plurality of holes aim at the plurality of slits and the sliding groove; and
    wherein the components enters the receiving recess from the box, air is injected into the plurality of holes to blow the components, and a position of the components is changed to pass through the plurality of slits and the sliding groove.

12. The sifting device as claimed in claim 11, wherein the receiving recess comprises a first portion and a second portion communicating with the first portion, and the plurality of protrusions protrude from a junction of the first portion and the second portion.

13. The sifting device as claimed in claim 12, wherein the sliding groove communicates with the second portion and extends to a distal end of the guiding board.

14. The sifting device as claimed in claim 12, wherein the covering board comprises a first covering plane, a second covering plane, a first peripheral plane, and a second peripheral plane, the first covering plane is opposite to the second covering plane, the first peripheral plane and the second peripheral plane are connected between the first covering plane and the second covering plane in parallel, the plurality of holes comprise a first mounting hole, a second mounting hole, and a third mounting hole, the first mounting hole transversely passes through the first peripheral plane and the second peripheral plane, the second mounting hole passes through the first peripheral plane, and the third mounting hole passes through the second peripheral plane.

15. The sifting device as claimed in claim 14, wherein the plurality of holes further comprise a plurality of first air holes, a second air hole, and a third air hole, the plurality of first air holes communicate with the first mounting hole and extend towards the second covering plane, the second air hole communicates with the second mounting hole and extends towards the second covering plane, the third air hole communicates with the third mounting hole and extends towards the second covering plane.

16. The sifting device as claimed in claim 15, wherein the plurality of first air holes aim at the plurality of slits, respectively, the second air hole aims at the second portion, and the third air hole aims at the sliding groove.

17. The sifting device as claimed in claim 11, further comprising two connecting boards leaning against the supporting frame, wherein the guiding board is fixed on the two connecting boards.

18. The sifting device as claimed in claim 11, further comprising a collecting assembly, wherein the collecting assembly comprises a baseplate and a baffle, the baseplate defines a guiding groove communicating with the sliding groove, the baffle is mounted on the baseplate to cover the guiding groove.

19. The sifting device as claimed in claim 18, wherein the baffle defines an outlet for partially exposing the guiding groove.

* * * * *